United States Patent
Cunningham

(10) Patent No.: US 6,942,192 B2
(45) Date of Patent: Sep. 13, 2005

(54) GATE VALVE WITH FLOW-THROUGH GATE

(75) Inventor: Christopher E. Cunningham, Spring, TX (US)

(73) Assignee: FMC Technologies, Inc., Chicago, IL (US)

(*) Notice: Subject to any disclaimer, the term of this patent is extended or adjusted under 35 U.S.C. 154(b) by 38 days.

(21) Appl. No.: 09/815,394

(22) Filed: Mar. 22, 2001

(65) Prior Publication Data

US 2001/0045538 A1 Nov. 29, 2001

Related U.S. Application Data

(60) Provisional application No. 60/192,124, filed on Mar. 24, 2000.

(51) Int. Cl.[7] ................................................. F16K 3/02
(52) U.S. Cl. ......................................... 251/62; 251/326
(58) Field of Search ........................... 251/31, 62, 326, 251/328, 329

(56) References Cited

U.S. PATENT DOCUMENTS

| | | | | |
|---|---|---|---|---|
| 396,239 A | * | 1/1889 | Schreuder ................. | 251/31 X |
| 1,546,907 A | * | 7/1925 | Krueger .................... | 251/31 X |
| 2,089,285 A | * | 8/1937 | Milliken ................... | 251/62 X |
| 2,630,828 A | * | 3/1953 | Bent ......................... | 251/31 X |
| 2,974,682 A | * | 3/1961 | Trask ....................... | 251/328 X |
| 3,104,659 A | * | 9/1963 | Smith ....................... | 251/26 X |
| 4,784,225 A | | 11/1988 | Petersen | |
| 4,800,917 A | * | 1/1989 | DePirro ................... | 251/329 X |
| 4,848,472 A | | 7/1989 | Hopper | |
| 5,143,158 A | | 9/1992 | Watkins et al. | |
| 5,248,123 A | * | 9/1993 | Richeson et al. ......... | 251/31 X |
| 5,415,378 A | * | 5/1995 | Craven ..................... | 251/329 |
| 5,687,794 A | | 11/1997 | Watkins et al. | |
| 6,257,548 B1 | | 7/2001 | Hiddessen et al. | |

FOREIGN PATENT DOCUMENTS

| | | |
|---|---|---|
| EP | 0 810 398 A2 | 12/1997 |
| FR | 77 31918 | 5/1978 |
| GB | 315189 | 7/1929 |
| GB | 547104 | 8/1942 |
| GB | 2 291 085 A | 1/1996 |
| GB | 2 339 444 A | 1/2000 |
| NO | 179759 C | 9/1996 |

* cited by examiner

Primary Examiner—Eric Keasel
(74) Attorney, Agent, or Firm—Henry C. Query, Jr.

(57) ABSTRACT

A gate valve for controlling the flow of fluid through a component having a fluid flow passage that includes at least a first branch and a second branch, the gate valve comprising a gate cavity which communicates with both the first branch and the second branch; a gate which is movably positioned in the gate cavity and which includes a first flow port that is connected to a second flow port; and an actuating mechanism for moving the gate between an open position, in which the first flow port is aligned with the first branch and the second flow port is in communication with the second branch, and a closed position, in which the first flow port is offset from the first branch; wherein the second flow port is divergent from the first flow port; whereby when the gate is in the open position, the direction of the flow of fluid through the gate valve is changed by the first and second flow ports.

7 Claims, 4 Drawing Sheets

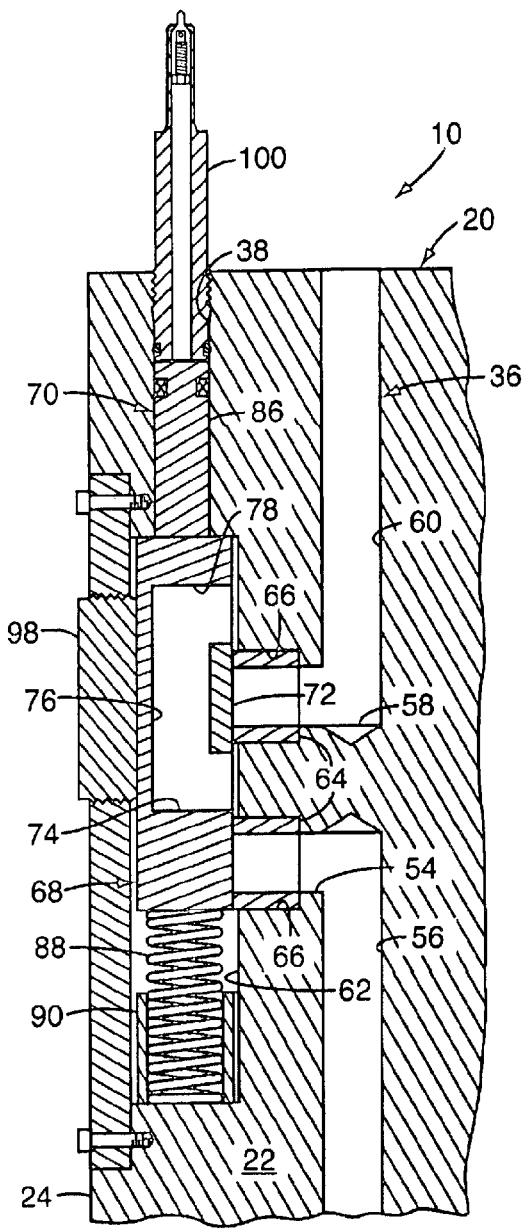
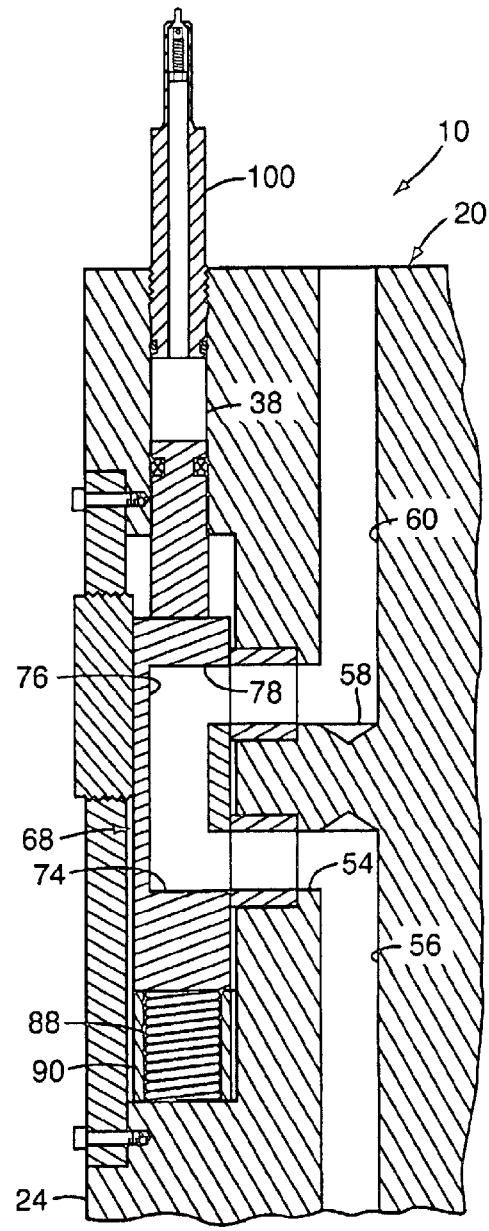
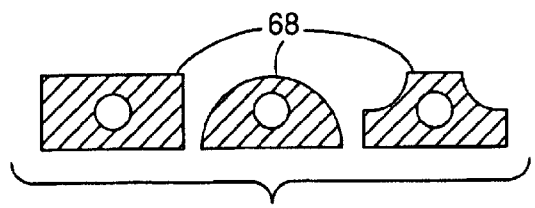
FIG. 3A    FIG. 3B
FIG. 3C

GATE VALVE WITH FLOW-THROUGH GATE

This application is based on U.S. Provisional Patent Application No. 60/192,124, which was filed on Mar. 24, 2000.

BACKGROUND OF THE INVENTION

The present invention relates to a gate valve which may be used to remotely control the flow of fluid through various components of a flow completion system, such as a tubing hanger. More particularly, the invention relates to such a gate valve which comprises a flow-through gate and which therefore occupies a minimum of the radial cross sectional area of the component.

The need to remotely and reliably control the flow of fluid through components having relatively small radial cross sectional areas is particularly strong in the field of flow completion systems for producing oil or gas from a subsea well. For example, a typical flow completion system comprises a tubing hanger which is suspended in a wellhead housing or a tubing spool and which supports at least one tubing string that extends to the well bore. The tubing hanger includes at least one axial production bore through which the well fluids are produced, one or more service and control conduits for communicating control signals or fluids from external service and control lines to corresponding devices or positions located in or below the tubing hanger, and possibly also a longitudinal annulus bore for connecting the tubing annulus with the portion of the flow completion system that is located above the tubing hanger.

In operation of the flow completion system, flow through the annulus bore and the service and control conduits must be carefully controlled to ensure that the well fluid does not escape into the environment. However, in view of the several bores that extend through the tubing hanger, little radial cross sectional area is available for installing a standard closure member, such as a gate valve. Moreover, in the prior art a wireline plug is typically used to close the annulus bore. However, each installation or removal of the plug requires a special running trip from a surface vessel. Furthermore, although several versions of remotely operable valves for controlling flow through the tubing hanger bores have been patented, these valves have for the most part been impractical to implement due to the limited radial cross sectional area that is available in the tubing hanger for such valves.

Therefore, a need exists for a remotely operable valve which can reliably control the flow of fluid through a flow completion system component but which occupies a minimum radial cross sectional area of the component.

SUMMARY OF THE INVENTION

In accordance with the present invention, these and other disadvantages in the prior art are overcome by providing a gate valve for controlling the flow of fluid through a flow completion system component having a fluid flow passage that includes at least a first branch and a second branch. The gate valve comprises a gate cavity which communicates with both the first branch and the second branch, a gate which is movably positioned in the gate cavity and which includes a first flow port that is connected to a second flow port, and an actuating mechanism for moving the gate between an open position, in which the first flow port is aligned with the first branch and the second flow port is in communication with the second branch, and a closed position, in which the first flow port is offset from the first branch, wherein the second flow port is divergent from the first flow port. In this manner, when the gate is in the open position the direction of the flow of fluid through the gate valve is changed by the first and second flow ports. In one embodiment of the invention, the second flow port is approximately perpendicular to the first flow port. In another embodiment of the invention, the gate comprises a third flow port which is approximately perpendicular to the second flow port and which is aligned with the second branch when the gate is in the open position.

Therefore it may be seen that the gate valve of the present invention provides a reliable yet compact device for remotely controlling fluid flow through the flow completion system component. The gate valve is similar to a conventional gate valve, which is recognized as being a robust and reliable closure member. In addition, the actuating mechanism permits the gate valve to be operated remotely, which therefore eliminates the need for separate running trips from a surface vessel to open or close the gate. Furthermore, since the direction of the fluid flow is changed through the gate, the first and second flow passages may be oriented generally axially and the lateral dimension of the gate cavity can be reduced so as to occupy a minimum radial cross-sectional area of the flow completion system component.

These and other objects and advantages of the present invention will be made apparent from the following detailed description, with reference to the accompanying drawings. In the drawings, the same reference numbers are used to denote similar components in the various embodiments.

BRIEF DESCRIPTION OF THE DRAWINGS

FIG. 3A is a longitudinal cross-sectional view of an alternative embodiment of the gate valve of the present invention shown in the closed position;

FIG. 3B is a longitudinal cross-sectional view of the gate valve of Figure 3A shown in the open position;

FIG. 3C are radial cross-sectional views of three alternative gate components of the gate valve shown in FIGS. 3A and 3B.

DETAILED DESCRIPTION OF THE PREFERRED EMBODIMENTS

While the gate valve of the present invention may be used to control flow through a variety of flow completion system components, it will be described hereafter in connection with the tubing hanger component of an exemplary flow completion system.

Figure 1:
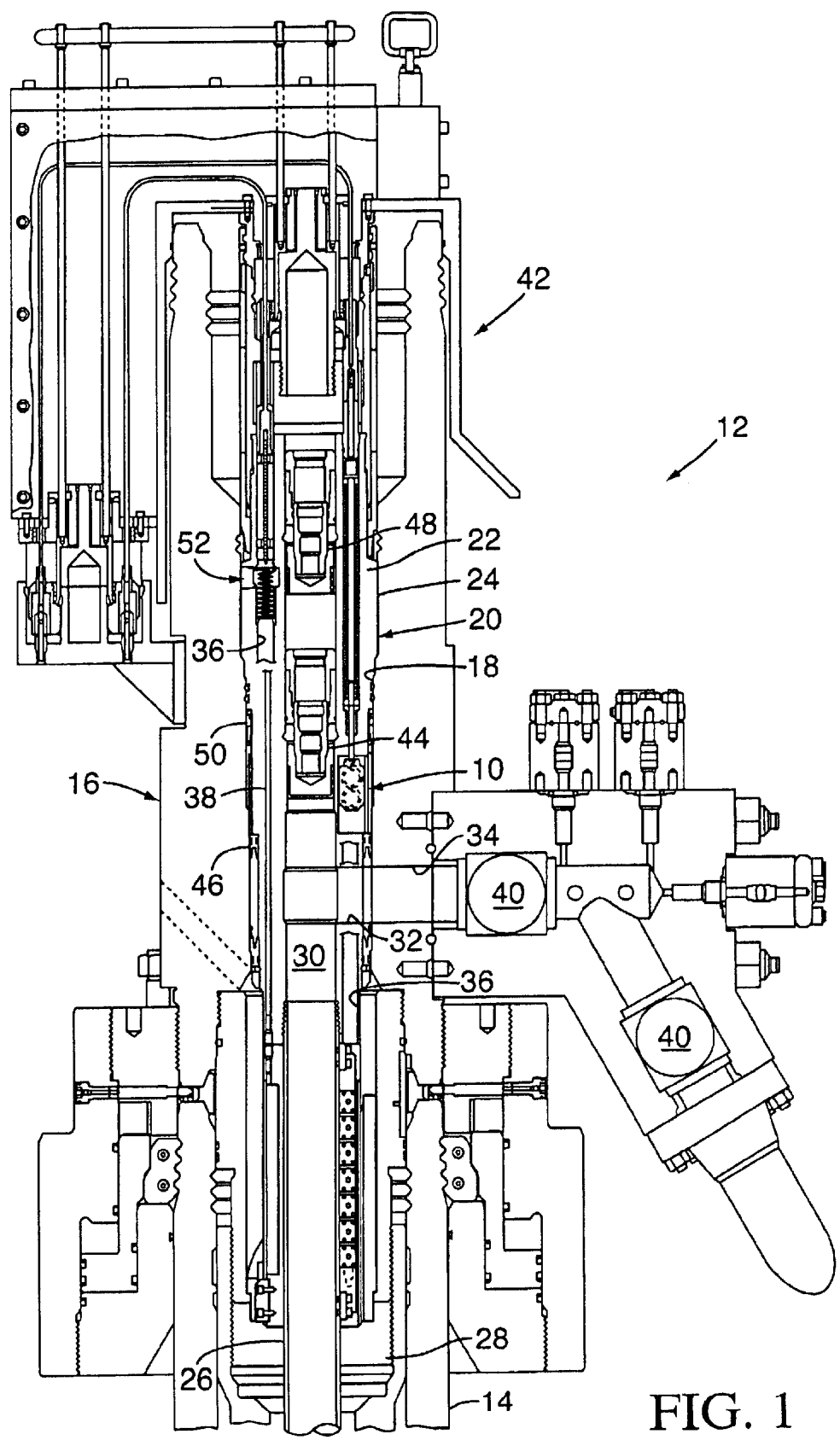
FIG. 1 is a longitudinal cross-sectional view of an exemplary flow completion system in which the gate valve of the present invention is installed.

Referring to FIG. 1, a preferred embodiment of the gate valve 10 is shown installed in an exemplary flow completion system 12. As explained more fully in applicants' co-pending U.S. patent application No. 09/815,437, which is hereby incorporated herein by reference, the flow completion system 12 comprises a wellhead housing 14 which is installed near the top of a well bore (not shown), a tubing spool 16 which is connected over the wellhead housing 14 and which includes a central bore 18 that extends axially therethrough, and a tubing hanger 20 which is supported in the central bore 18 and which includes a generally annular body 22 having an outer, stepped cylindrical wall 24. The tubing hanger 20 supports at least one tubing string 26 which extends into the well bore and defines a tubing annulus 28 surrounding the tubing string. In addition, the tubing hanger 20 includes a concentric production bore 30 which communicates with the tubing string 26, a lateral production passageway 32 which extends between the production bore 30 and a production outlet 34 in the tubing spool 16, an annulus bore 36 which extends generally axially between the tubing annulus 28 and a portion of the central bore 18 located above the tubing hanger, and a number of service and control conduits 38 which extend generally axially through the tubing hanger. The flow completion system may also comprise one or more valves 40 for controlling flow through the production outlet 34, and a controls bridge 42 for connecting the annulus bore 36 and the service and control conduits 38 with corresponding external service and control lines (not shown).

In the flow completion system 12 depicted in FIG. 1, the tubing hanger 20 preferably also includes both of the industry required first and second barriers between the well bore and the environment, thus eliminating the need for a separate pressure sealing tree cap. The first barrier is provided by a first wireline crown plug 44 that is disposed in the production bore 30 above the production passageway 32, and a first annular, preferably metal seal 46 which is positioned between the tubing hanger 20 and the tubing spool 16 above the production passageway. Similarly, the second barrier is provided by a second wireline crown plug 48 that is mounted in the production bore 30 above the first crown plug 44, and a second annular, preferably metal seal 50 which is positioned between the tubing hanger 20 and the tubing spool 16 above the first seal 46. In accordance with the present invention, the tubing hanger 20 also includes the gate valve 10 and, in the embodiment of the invention depicted in FIG. 1, preferably also a second closure member 52, such as a sting open check valve, for controlling fluid flow through the annulus bore 36.

Figure 2:
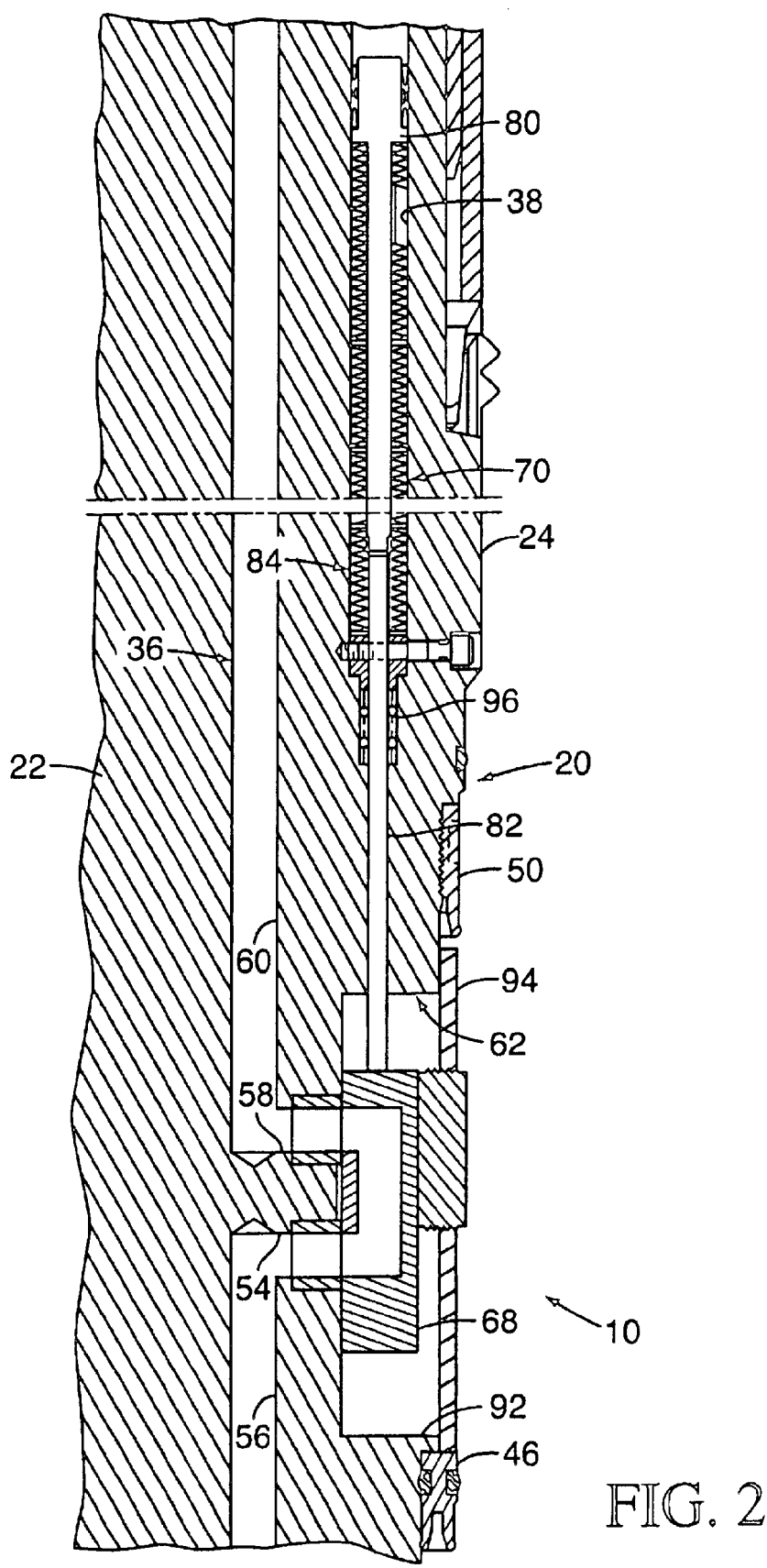
FIG. 2 is a longitudinal cross-sectional view of the tubing hanger component of the flow completion system of FIG. 1 showing the gate valve of the present invention installed therein.

Referring to FIG. 2, substantially all of the operational components of the gate valve are housed entirely within the body 22 of the tubing hanger 20. In addition, the gate valve 10 is oriented generally axially within the body so as to occupy a minimum of the radial cross sectional area of the tubing hanger. In order to most readily accommodate this vertical orientation of the gate valve 10, the annulus bore 36 preferably includes a lateral branch which is connected to a longitudinal branch, and the gate valve is disposed within a gate cavity that is positioned between the branches. For example, in the embodiment of the invention depicted in FIG. 2, the annulus bore 36 is shown to comprise a lower lateral branch 54 which extends generally laterally through the body 22, a lower axial branch 56 which extends generally axially through the body between the lower lateral branch and the tubing annulus, an upper lateral branch 58 which extends generally laterally through the body, and an upper axial branch 60 which extends generally axially through the body between the upper lateral branch and the portion of the central bore 18 that is located above the tubing hanger.

The gate valve 10 will now be described with reference to FIGS. 3A through 3C, which depict a slightly modified version of the gate valve from the embodiment shown in FIG. 2. Referring to FIG. 3A, the gate valve 10 is shown to comprise a gate cavity 62 which is formed in the body 22 of the tubing hanger 20 and is connected to the branches 54 and 58, two preferably floating seats 64, each of which is mounted in a respective seat pocket 66 that is formed in the body at the intersection of each branch 54, 58 with the gate cavity, a gate 68 which is slidably disposed within the gate cavity adjacent the seats, and an actuating mechanism 70 which is positioned in a service and control conduit 38 that is oriented generally vertically over the gate cavity. The gate 68 includes a generally flat face 72 which is adapted to sealingly engage the seats 64 when the gate valve 10 is in the closed position. In addition, the gate 68 may have any of a variety of transverse cross-sectional configurations, including any of the configurations depicted in FIG. 3C.

The gate 68 also comprises a generally lateral first flow port 74 which extends from the face 72, a generally longitudinal second flow port 76 which is connected to the first flow port, and, in the embodiment of the invention depicted in FIG. 3A, a generally lateral third flow port 78 which extends between the second flow port and the face 72. Thus, the second flow port 76 is divergent from the first flow port 74, and the third flow port 78 is divergent from the second flow port 76. In the context of the present invention, this means that the axis of the second flow port 76 is offset angularly relative to the axis of the first flow port 74, and the axis of the third flow port 78 is offset angularly relative to the axis of the second flow port 76. In the embodiment of the invention shown in FIG. 3A the amount of angular offset between both the second and first flow ports and the third and second flow ports is approximately ninety degrees. In this manner, the flow ports function to change the direction of fluid flow through the gate 68 by 180 degrees.

The actuating mechanism 70 functions to move the gate 68 between a valve open position, in which the first flow port 74 is aligned with the lower lateral branch 54 and the third flow port 78 is aligned with the upper lateral branch 58, and a valve closed position, in which the first and third flow ports 74, 78 are offset from the respective branches 54 and 58. In the embodiment of the invention depicted in FIG. 2, the actuating mechanism 70 is similar to that described in applicants' co-pending U.S. patent application Ser. No. 09/815,436, which is hereby incorporated herein by reference. Thus, the actuating mechanism 70 comprises a piston head 80 which sealingly engages the service and control conduit 38, a valve stem 82 which is connected between the piston head and the gate 68, and a mechanical return biasing mechanism 84, such as a stack of Belleville washers, that is operatively engaged between the piston head 80 and the body 22 of the tubing hanger 20.

In the embodiment of the invention shown in FIG. 3A, the actuating mechanism 70 includes a piston 86 which sealingly engages the service and control conduit 38 and which is connected to the gate 68. The actuating mechanism 70 also comprises a mechanical return biasing mechanism, such as a spring 88, which is operatively engaged between the gate 68 and the body 22 to urge the gate into, for example, the closed position. The spring 88 may be positioned between the bottom of the gate 68 and the bottom of the gate cavity 62, in which event the actuating mechanism 70 preferably also includes a stop sleeve 90 to limit the downward movement of the gate 68. Of course, the actuating mechanism, including the return biasing mechanism, could be any mechanical, electrical or hydraulic mechanism that is currently known by those skilled in the art to be useful for moving the gate between its open and closed positions.

In the embodiment of the invention illustrated in FIG. 2, the gate cavity 62 extends into the body 22 of the tubing hanger 20 between the first and second annular seals 46, 50 and consequently forms an opening 92 in the wall 24 that is positioned between the seals. The opening 92 is optimally closed by a simple cover plate 94 that may be secured to the tubing hanger 20 by any suitable means. The pressure within the gate cavity 62 is preferably contained by the first and second seals 46, 50 and a stem packing 96. Therefore, no need exists for a separate seal or seals between the cover plate 94 and the body 22 to contain the pressure within the gate cavity 62. However, the present invention contemplates that one or more such seals could be provided between the cover plate and the body to contain the pressure within the gate cavity, especially when the opening 92 is not located between the seals 46, 50.

In the closed position of the gate valve 10, which is shown in FIG. 3A, the gate 68 will seal off the annulus bore 36 by preventing fluid flow between the lower lateral branch 54 and the upper lateral branch 58. In order to ensure that the gate 68 sealingly engages the seats 64, the gate valve 10 may include a load reaction disc 98 which is threadedly received in a corresponding orifice in the cover plate 94. Accordingly, the load reaction disc 98 may be tightened against the gate 68 to ensure that it engages the seats 64 with sufficient force to prevent fluid from leaking past the seat-to-gate interface.

When it is desired to open the gate valve, pressurized hydraulic fluid is introduced into the service and control conduit 38 above the piston 86 through, for example, a male coupling 100. The hydraulic fluid will force the piston 86 downward, and the piston will in turn push the gate 68 downward until the gate contacts the stop sleeve 90. In this position, which is shown in FIG. 3B, the lateral first and third flow ports 74 and 78 are aligned with the lateral branches 54 and 58, respectively, and the annulus bore 36 is therefore opened. In order to return the gate valve to the closed position, the hydraulic fluid is removed from above the piston 86, thus allowing the spring 88 to push the gate 68 upward until it contacts the top of the gate cavity 62.

Figure 4:
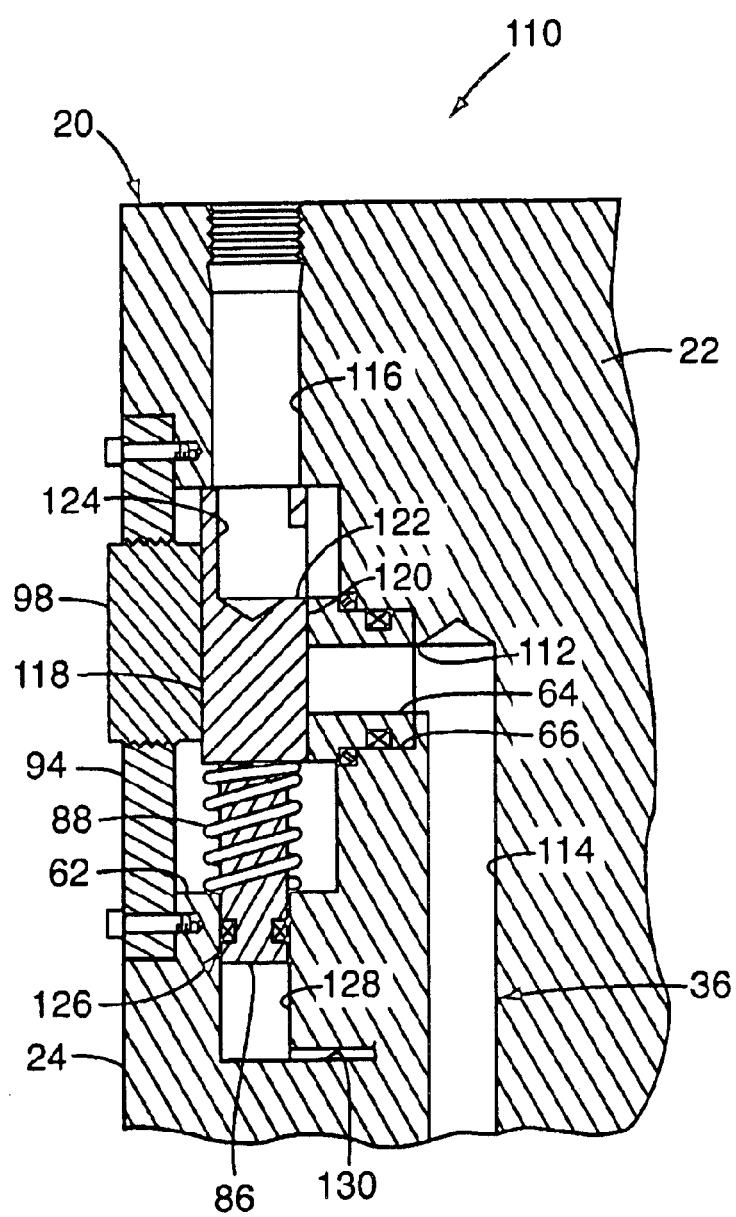
FIG. 4 is a longitudinal cross-sectional view of another embodiment of the gate valve of the present invention.

Referring now to FIG. 4, another embodiment of a gate valve of the present invention, which is indicated generally at 110, is shown installed in a tubing hanger 20. In this embodiment, the annulus bore 36 of the tubing hanger 20 includes a lateral branch 112 which extends generally laterally through the body 22 from the gate cavity 62, a lower axial branch 114 which extends generally axially through the body between the lateral branch and the tubing annulus, and an upper axial branch 116 which extends generally axially through the body between the gate cavity and the portion of the central bore 18 that is located above the tubing hanger. In addition, the gate valve 110 of this embodiment comprises a single seat 64 which is mounted in a seat pocket 66 that is formed at the intersection of the lateral branch 112 with the gate cavity 62, and a gate 118 which is slidably disposed in the gate cavity 62 against the seat 64. The gate 118 includes a front face 120 which sealingly engages the seat 64, a generally lateral first flow port 122 which extends from the front face, and a generally longitudinal second flow port 124 which extends between the first flow port and the top of the gate. In this manner, the gate will change the direction of the fluid flow by 90 degrees.

The gate valve 110 also comprises an actuating mechanism 126 for moving the gate 118 between an open position, in which the lateral first flow port 122 is aligned with the lateral branch 112, and a closed position, in which the first flow port is offset from the lateral branch. The actuating mechanism 126 includes a piston 86 which sealingly engages a bore 128 that is positioned below the gate 118, a conduit 130 for connecting the bore with a source of negative pressure, and a return biasing mechanism, such as a spring 88. Of course, the actuating mechanism 126, including the return biasing mechanism, can be any such mechanism disclosed herein or in applicants' above-mentioned co-pending U.S. patent application Ser. No. 09/815,436.

When the gate valve 110 is in the closed position, which is shown in FIG. 4, the gate 118 will seal against the seat 64 and prevent fluid from flowing between the branches 112 and 116 of the annulus bore 36. As in the previous embodiment, the gate valve 110 preferably includes a load reaction disc 98 for urging the gate 118 into tight sealing engagement with the seat 64. In order to open the gate valve 110, the bore is exposed to the source of negative pressure via the conduit 130. The negative pressure will consequently draw the piston 86, and thus the gate 118, downward into the open position. When it is desired to again close the gate valve 110, the negative pressure is removed from the bore 128, thus allowing the spring 88 to push the gate upward into the closed position.

It should be recognized that, while the present invention has been described in relation to the preferred embodiments thereof, those skilled in the art may develop a wide variation of structural and operational details without departing from the principles of the invention. For example different features of the various embodiments may be combined in a manner not discussed herein. Therefore, the appended claims are to be construed to cover all equivalents falling within the true scope and spirit of the invention.

What is claimed is:

1. A gate valve comprising:

an elongated body;

a fluid flow passage which extends generally longitudinally through the body and which includes at least a lateral first branch that is in fluid communication with a longitudinal second branch;

a gate cavity which is formed in the body and which is in fluid communication with both the first branch and the second branch;

a gate which is movably positioned in the gate cavity and which includes a first flow port that is connected to a second flow port; and means for actuating the gate between an open position, in which the first flow port is aligned with the first branch and the second flow port is in fluid communication with the second branch, and a closed position, in which the first flow port is offset from the first branch;

wherein the gate further comprises a generally flat face which is adapted to seal the first branch from the gate cavity when the gate is in the closed position to thereby prevent the fluid from flowing between the first branch and the gate cavity; and wherein the actuating means is disposed at least partially within a conduit that extends generally longitudinally through the body from the gate cavity.

2. The gate valve of claim 1, wherein the second flow port is approximately perpendicular to the first flow port.

3. The gate valve of claim 2, wherein the gate comprises a third flow port which is connected approximately perpendicular to the second flow port and which is aligned with the second branch when the gate is in the open position.

4. The gate valve of claim 1, wherein the actuating means comprises:

a piston which is connected to the gate and which sealingly engages the conduit; and means for conveying hydraulic pressure to a first portion of the conduit to thereby move the gate in a first direction.

5. The gate valve of claim 4, wherein the actuating means further comprises means for moving the gate in a second direction which is opposite to the first direction.

6. The gate valve of claim 5, wherein the moving means comprises a mechanical biasing means.

7. The gate valve of claim 5, wherein the moving means comprises means for conveying hydraulic pressure to a second portion of the conduit which is separated from the first portion of the conduit by the piston.

* * * * *